United States Patent Office 3,301,804
Patented Jan. 31, 1967

---

3,301,804
AQUEOUS EMULSION COMPRISING REACTION PRODUCT OF LIQUID EPOXY RESIN AND AMINO BORIC ACID ESTER
John G. Zora, West Mifflin Borough, Allegheny County, Pa., and Donald V. Todd, Denville, N.J., assignors to Koppers Company, Inc., a corporation of Delaware
No Drawing. Filed Sept. 30, 1963, Ser. No. 312,347
3 Claims. (Cl. 260—29.2)

This invention relates generally to aqueous emulsions of epoxy resins.

Epoxy resins are widely used in protective coatings. The formulations commonly involve unusual solvents as epoxy resins are soluble in oxygenated solvents such as ketones, esters, and ether alcohols and in some chlorinated solvents but are either insoluble or difficultly soluble in alcohols, aliphatic hydrocarbons, aromatic hydrocarbons. Epoxy resins are not soluble in water. In commercial practice, therefore, a wide variety of organic fatty acids, rosin acids, and tar oils are used to esterify the resin to increase its solubility, thereby producing binder compositions that vary widely in properties and applicability in paint.

It has been particularly difficult to form aqueous emulsions of epoxy resins. It is, of course, desirable in any aqueous emulsion to provide the emulsion with a fugitive surfactant. In such instances, the surfactant disappears; and there is no tendency for the resulting film to re-emulsify or to be water-sensitive.

In accordance with this invention, there has now been discovered a novel aqueous emulsion of an epoxy resin utilizing a curing agent as a surfactant whereby the subsequent cross-linking of the curing agent with the epoxy agent resin gives a thermoset resinous product containing no surfactant. The emulsion is stable for an extended period of time.

It has now been discovered, in accordance with this invention, that the preliminary reaction product of a boric acid ester derived from an alkylene glycol and a beta-dialkyl substituted amino-alkanol and an epoxy resin is dispersable in an aqueous medium to provide a stable aqueous dispersion. Thereafter, the dispersion can be heated to a temperature in a conventional manner to cross link to a thermoset, infusible, insoluble composition.

In accordance with this invention, the boron ester is added to the epoxy resin while the epoxy resin is in a liquid state. Advantageously, the epoxy resin is heated to a temperature of about 55° C. to a highly fluid condition, and boric acid ester is added to the epoxy resin to the extent of at least three parts per hundred parts of resin and advantageously to the extent of eight to ten parts; equal parts may be used, but economics dictates the upper limit. The material is allowed to react for a period of time of at least about five minutes. Thereafter, water is added to the solution with mixing to form the emulsion. Because of the thickness of the emulsion, it has been difficult to obtain emulsions which contain over 55% solids. Emulsions are readily formed with 40 to 50% solids. After the emulsion has been formed, it can be diluted with water; and the emulsion remains stable even though the dilution be continued until there is two parts or less of solids.

The resulting emulsions have been found to have wide utility in coatings, laminates, adhesives, and other areas where low viscosity resinous product is desirable. Such products are one-component systems to which no additional hardener need be added to effect a cure. Cure is initiated simply by evaporation of water and thereafter subjecting the residue to heat in a customary manner.

It is essential in accordance with this invention that the epoxy resin be a liquid at the time of addition of the boric acid ester and at the time of addition of the water. A precuring of the ester and resin is necessary to form the emulsion. A mixture of powdered resin and boric acid ester will not emulsify nor will a mixture of the ester and resin (even though liquid) emulsify in water unless a reaction has taken place between the ester and the resin. Epoxy resins liberate heat as an exotherm during their curing cycle, and a common way to minimize this exotherm is to cure in stages. It is surprising that a precured resin in accordance with this invention will form an emulsion. The cured epoxy resin-boric acid ester is resistant to water. The boric acid ester, itself, will not form an emulsion with water and powdered or liquid epoxy resin.

Both the epoxy resin and the cured resin are known to be insoluble in water. It is postulated that perhaps an adduct forms or an incipient cross linking occurs which opens a bond sufficiently to render a portion of the resulting molecule hydrophyllic whereby the emulsion can be formed.

The boric acid ester for use in this invention derived from both an alkylene glycol and a beta-dialkyl substituted amino-alkanol has the general formula $$R\underset{O}{\overset{O}{\diagdown\diagup}}B-O-R-N\diagdown\diagup\underset{R}{\overset{R}{}}$$

where R is an alkyl group having from 2–6 carbon atoms in the chain, and the R may be the same or different alkyl groups.

A preferred boric acid ester is 2-($\beta$-dimethylamino-ethoxy)-4-methyl-1,3,2-dioxaborinane. The compound is sold under the tradename USB 110.

The epoxy resin for use in this invention may be any of the commercially available epoxy resins that have a softening point below 80° C. One class of resins are the epoxidized novolak resins. Typical epoxy resins, for example, are those sold under the tradename Kopox. Typical of this class is a preferred epoxidized novolak resin, Kopox 357, which has the general formula:

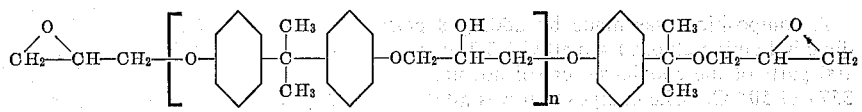

Another class of resin is formed by reacting bisphenol and epichlorohydrin in an alkaline medium. Such resins are sold, for example, under the tradename Epon. A preferred resin is Epon 828 which has the general formula:

Still other resins are sold under the tradename Oxiron and are epoxidized polyolefins having the general formula:

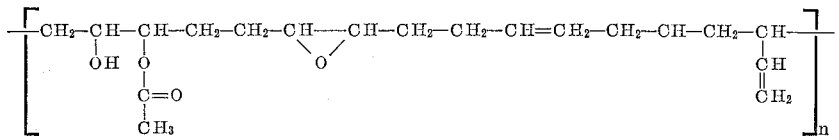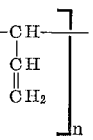

In the above oxirane compounds, $n$ is greater than 1.

The invention will be illustrated further by the following examples:

EXAMPLE I

One hundred parts of an epoxy resin, that is, an epoxidized cresol formaldehyde novolak resin (Kopox 357 having a molecular weight of about 540) was heated to 55° C. in a resin flask having an agitator. Ten parts of 2-($\beta$-dimethyl-amino-ethoxy)-4-methyl-1,3,2-dioxaborinane was slowly dripped into the flask and mixed therein. Then 165 parts of water were added with mixing. An oil-in-water emulsion occurred. The emulsions had a pH of 10.6 and the particles were of a size less than 0.9 micron. Aliquot portions were taken from the mass.

(a) One aliquot showed some precipitation at the end of seven weeks when kept at room temperature.

(b) Another aliquot stored at 40° F. showed no precipitation at the end of three months.

(c) Another aliquot had a viscosity initially of 58,000 centipoises and had a viscosity at the end of thirty-two days of 7,800 centipoises.

(d) Another aliquot had an initial epoxide content of 2.94 weight percent, an epoxide content of 2.91 weight percent at the end of four days, an epoxide content of 2.86 weight percent at the end of eleven days, and an epoxide content of 2.67 weight percent at the end of thirty-two days.

(e) An aliquot was applied to a series of clean steel panels as wet films having a thickness of three mils. The films were dried at room temperature at ambient conditions for one hour and then baked at 150° C. for one hour. Thereafter, one panel was immersed in toluene, another in methylisobutyl ketone, another in 5% sodium hydroxide solution, another in jet fuel, and still another in 5% hydrochloric acid solution. At the end of 500 hours of immersion time at room temperature, the films were hard and intact except for the specimen which was immersed in hydrochloric acid, and which developed several pinholes, apparently due to an incomplete coverage of the panel by the film.

EXAMPLE II

Fifty parts of the 2-($\beta$-dimethyl-amino-ethoxy)-4-methyl-1,3,2-dioxaborinane and 100 parts of an epoxidized cresol novolak resin (Kopox 357) were mixed at 55° C. and allowed to react for five minutes. Then the mass was divided into aliquots. One aliquot was poured into a container holding 250 grams of water. The container was placed on a roller mixer and allowed to mix for two hours. At the end of this time, an emulsion had taken place.

A second aliquot was placed in an aluminum container to form a thick casting and heated for two hours at 150° C., and the cast material was then crushed into granules. These granules were added to 250 grams of water and agitated for two hours. At the end of this time, about half of the material from the castings had mixed with the water to give a light yellow emulsion whose particles were so small as to give the appearance of a solution.

EXAMPLE III

A composition was made by adding 8 parts of 2-($\beta$-dimethyl-amino-ethoxy)-4-methyl-1,3,2-dioxaborinane to 100 parts of the epoxidized cresol novolak resin (Kopox 357) at 50° C. The composition was allowed to mix for ten minutes and 108 parts of water added thereto with mixing. An emulsion of oil-in-water resulted.

EXAMPLE IV

The procedure of Example III was repeated except that 16 parts of 2-($\beta$-dimethyl-amino-ethoxy)-4-methyl-1,3,2-dioxaborinane were added to 100 parts of the epoxidized cresol novolak resin. The resulting mixture was then diluted with 116 parts of water to form an oil-in-water emulsion.

EXAMPLE V

Eight parts of 2-($\beta$-dimethyl-amino-ethoxy)-4-methyl-1,3,2-dixaborinane and 100 parts of epoxidized cresol resin (Kopox 357) were mixed and heated to a temperature of 120° C. and maintained there for a period of three hours. A hard cured product resulted.

EXAMPLE VI

Specimens from Examples III, IV and V were subjected to a heat distortion test. For this test, castings (5" x ½" x ⅛") were formed from the emulsion's formulation of Examples III, IV and V by air-drying the emulsion formulation for an hour and then heating one specimen of each for 16 hours at 100° C. and another specimen of each for 16 hours at 120° C. The results were as follows:

| Ex. | Temperature, ° C. | HDT | Room Temperature | |
|---|---|---|---|---|
| | | | Flex. strength, p.s.i. | Flex. Modulus |
| III | 100 | 65 | 8,100 | 0.52×10⁶ |
| III | 120 | 111 | 17,900 | 0.52×10⁶ |
| IV | 100 | 82 | 2,800 | 0.52×10⁶ |
| IV | 120 | 137 | 11,600 | 0.52×10⁶ |
| V | 120 | 165 | | |

EXAMPLE VII

Castings were made from the compositions of Examples II and IV. The castings were then air dried and then cured by heating them for two hours at 110° C., thereafter for one hour at 160° C., then for two hours at 190° C. and followed by five hours at 205° C. These castings, in accordance with common practice, were immersed in solvents and the weight gain recorded.

| Solvent | Weight Increase, Percent | | | |
|---|---|---|---|---|
| | Example II | | Example IV | |
| | 7 days | 30 days | 7 days | 30 days |
| Acetone | 0.85 | 3.8 | 1.72 | (¹) |
| Ethylene dichloride | 0.60 | 3.8 | 1.70 | |
| 10% H₂NO₃ | 0.65 | 1.46 | 0.75 | 1.75 |
| 10% NaOH | 0.59 | 1.26 | 0.56 | 1.20 |
| 30% NaOH | 0.20 | 0.51 | 0.19 | 0.46 |
| 10% Hcl | 0.54 | 1.20 | 0.54 | 1.17 |
| 30% Hcl | 0.82 | 2.3 | 3.23 | 6.5 |
| 10% H₂SO₄ | 0.65 | 1.37 | 0.63 | 1.34 |
| 30% H₂SO₄ | 0.43 | .91 | 0.42 | 0.91 |
| Distilled H₂O | 0.71 | 1.54 | 0.71 | 1.54 |

¹ Disintegrated.

EXAMPLE VIII

To 100 grams of an epoxy novolak resin (Kopox 357) at 50° C. were added 10 grams of 2-($\beta$-dimethyl-amino-ethoxy)-4-methyl-1,3,2-dioxaborinane and the mixture was mixed with a small propeller-type mixer. After a reaction time of about five minutes, 175 grams of water were slowly added through a burette. Inversion to an oil-in-water emulsion occurred at about a 43% solids content.

EXAMPLE IX

Again, 8 grams of 2-(β-dimethyl-amino-ethoxy)-4-methyl-1,3,2-dioxaborinane and 100 grams of an epoxy novolak resin (Kopox 357) were mixed at 50° C. in a resin kettle. Then 165 grams of water was poured all at once on top of the mixture. A small propeller-type mixer was placed in the water phase and allowed to turn very slowly. Within five minutes, the mixture began to emulsify and be absorbed into the water phase. After an hour of mixing, there were approximately 50 to 75 grams of unemulsified material on the bottom of the kettle. At that point, the mass was heated to 45° C. The remainder of the material emulsified.

EXAMPLE X

This time, 8 grams of 2-(β-dimethyl-amino-ethoxy)-4-methyl-1,3,2-dioxaborinane were mixed with 100 grams of epoxy novolak resin (Kopox 357) at approximately 50° C. Then 100 grams of water were added immediately to the warm solution, thus allowing no reaction time to the mixture. Even though 300 grams of additional water were added, inversion to an oil-in-water emulsion never occurred; and upon cooling, the mixture curdled and the water and resin separated.

EXAMPLE XI

Again, 8 grams of 2-(β-dimethyl-amino-ethoxy)-4-methyl-1,3,2-dioxaborinane and 100 grams of epoxy novolak resin (Kopox 357) were mixed at 50° C. After complete mixing, a waiting period of 15 minutes at this temperature was allowed. The viscosity rose considerably during this time. Then 100 grams of water were added to the mix and was absorbed by the resin without the mixture changing color. An emulsion (a paste at room temperature) was obtained.

EXAMPLE XII

Immediately after combining 100 grams of epoxidized bisphenol (Epon 828) and 8 grams of 2-(β-dimethyl-amino-ethoxy)-4-methyl-1,3,2-dioxaborinane at room temperature, 150 grams of water were added. A water-in-oil emulsion seemed to occur quite readily but later showed no signs of inverting to an oil-in-water emulsion. After standing for about one hour at room temperature, the emulsion completely separated.

EXAMPLE XIII

There were mixed 100 grams of epoxidized bisphenol (Epon 828) and 8 grams of 2-(β-dimethyl-amino-ethoxy)-4-methyl-1,3,2-dioxaborinane at 50° C. No viscosity increase was noticeable at this temperature after a period of 15 minutes. The mixture was then placed into an oven at 150° C. for 10 minutes. The viscosity increased greatly. At that point, the resin mix was placed in a heating mantle and addition of 150 grams of water started. An emulsion was first obtained but changed character as more water was added until at the end of the water addition, the particles were so small as to approach a solution.

EXAMPLE XIV

One hundred parts of the epoxy resin (Kopox 357) were heated to 60–70° C. The resulting liquid was placed under agitation and 9 parts of 2-(β-dimethyl-amino-ethoxy)-4-methyl-1,3,2-dioxaborinane were added dropwise over a period of 20 minutes. Due to the exotherm produced, the temperature at times approached 90° C. Then, 165 parts of water were added over a period of 45 minutes with stirring. An emulsion resulted containing 40 to 42% solids. A stirring was continued until the material cooled to room temperature.

EXAMPLE XV

There was dissolved 5 parts of tetraethylene pentamine in 33 parts of water, and the solution was allowed to cool. Then, the solution was added with stirring to 100 parts of the emulsion of Example XIV. The composition was allowed to age for 45 minutes. The composition was applied to concrete with a brush. Within 45 minutes, a water and solvent-resistant film had developed. The film strongly adhered to the concrete.

EXAMPLE XVI

There was dissolved 5 parts of tetramethylethylene diamine in 33 parts of water. This solution was then stirred into 100 parts of the emulsion of Example XIV. The composition was allowed to age for two hours and was then painted by a brush onto a clean metal substrate. Depending upon the thickness of the film, the film dried to a hard film in 24 to 48 hours. The film was water and solvent-resistant.

EXAMPLE XVII

To 100 parts of the composition of Example XIV were added 35 parts of water. The resulting emulsion was applied as a film to a series of clean metal substrates. It was air dried for 20 minutes under ambient conditions and then baked at 150° C. for one hour. A clear hard film formed. The films were not affected by exposure at room temperature for 500 hours to toluene, methylisobutyl ketone, jet fuel, and 20% aqueous sodium hydroxide solution. When a film was immersed in a 20% hydrochloric acid solution, some deterioration began to appear, however, after 100 hours' exposure.

EXAMPLE XVIII

There was dissolved 5 parts tetraethylene pentamine in 33 parts of water, and the solution was added to 100 parts of the emulsion of Example XIV. After aging the composition for an hour, the composition was applied as a film onto a clean metal substrate. The film was allowed to air dry for 20 minutes under ambient conditions and then was baked at a temperature of 100° C. for 30 minutes. A clear hard solvent-resistant film resulted.

EXAMPLE XIX

A rust inhibitor primer was prepared by adding 24 parts of iron oxide pigment, 4 parts of zinc oxide pigment, 4 parts of zinc chromate pigment, 12 parts of magnesium silicate, 12 parts of calcium carbonate to 100 parts of the emulsion of Example XIV. This mixture was mixed in a ball mill for 16 hours.

A solution was prepared by dissolving 6 parts of tetraethyl pentamine in 140 parts of water. The solution and the mixture from the ball mill were mixed and allowed to age for two hours. The resulting emulsion contained about 33% solids. The material provides a protective primer coating for ferrous surfaces.

EXAMPLE XX

To produce a white enamel, 40 parts of titanium hydroxide pigment and 100 parts of the emulsion of Example XIV were mixed in a ball mill for 16 hours. The resulting white emulsion was applied to a clean metal surface and was air dried for about 20 minutes; then it was baked for a period of about one hour at 150° C. White enamel resulted.

EXAMPLE XXI

Five parts of tetraethylene pentamine were dissolved in 26 parts of water, and the solution added to the emulsion of Example XIV. The resulting composition was mixed and aged for two hours. It provided a white enamel for substrates. The enamel cured at room temperature to a solvent-resistant film.

EXAMPLE XXII

The composition of Example XIV was applied to aluminum, steel, glass, and copper strips whose surfaces had been cleansed in accordance with the usual procedures. After twenty minutes open assembly time, the strips were tested in accordance with ASTM specification 1002–53–T tensile strength. The following results were obtained.

| Substrates: | Tensile strength, p.s.i. |
|---|---|
| Aluminum to aluminum | 1800 |
| Steel to steel | 1500 |
| Glass to glass | 2200 |
| Copper to copper | 2000 |
| Aluminum to glass | 2000 |
| Aluminum to steel | 1700 |
| Aluminum to copper | 1800 |

EXAMPLE XXIII

The emulsion of Example V was applied to a porous concrete block. Within three to five days, the film had changed to a hard, insoluble, infusible, film.

EXAMPLE XXIV

A cubicle mold of one foot in dimension was filled with the composition of Example XIV. Thereafter, three pounds of diethylenetriamine were stirred into the composition. The mold was permitted to sit overnight. A solid homogeneous cube having dimensions of one foot resulted. The water was no longer present, as such. The block had a dry feel and appearance. Slices showed a one-component homogeneous system to exist. The material did not lose weight after being placed in a conventional drying oven. The block showed particularly good ablative properties.

EXAMPLE XXV

Laminates were prepared by dipping 36 inch by 12 inch strips of glass cloth, style 181, Volan A finish, in a bath of the emulsion of Example XIV. The strips were air dried at room temperature for one hour and assembled into laminates of 13 plies. After pressing the assembly at a temperature of 170° C. for 30 minutes, the laminates were post-cured at 120° C. for 10 hours. Specimens cut from these laminates gave the following values:

| | |
|---|---|
| Flexural strength at room temperature, p.s.i. | 82,300 |
| Flexural Modulus at room temperature | $2.97 \times 10^6$ |
| Tensile strength at room temperature, p.s.i. | 56,300 |
| Average thickness, inches | .114 |
| Resin content by weight, percent | 29 |

The foregoing has presented a novel stable emulsion formed of an epoxy resin and a curing agent therefor. The curing agent acts as the surfactan which cross links with the epoxy resin so that the surfactant or emulsifier no longer exists as such. Since the surfactant disappears, the final product has no tendency towards water-sensitivity or water re-emulsification. The emulsion being of aqueous nature is free from toxic and flammable solvents. The emulsion also being stable, even though greatly diluted, enables it to have widely varied uses, for example, as an additive to the beater in the Fourdrinier machine to obtain enhanced chemical resistance in the resulting paper. Since the cross linking of the epoxy resin and curing agent can take place at ambient temperatures, it provides, for example, excellent sizing material for concrete blocks and the like.

We claim:
1. A process for the preparation of an aqueous emulsion of an epoxy resin and a surfactant agent that is capable of functioning as a cross-linking curing agent with said epoxy resin upon application of the emulsion to a surface as a coating to form thereby a cured thermoset water insoluble resinous product which comprises:
    (a) reacting from 3 to 10 parts of a boric acid ester derived from boric acid and both an alkylene glycol and a beta-dialkyl substituted amino-alkanol having the general formula:

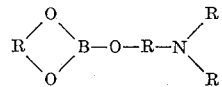

where R is an alkyl group having from 2–6 carbon atoms in the chain, and the R may be the same or different alkyl groups, with 100 parts of a liquid epoxy resin, for a period of time of from 5 minutes to 15 minutes at a temperature of about 50–55° C. to form a partially cured liquid resin;
    (b) blending the partially cured liquid resin with a sufficient amount of water to form an emulsion of the resin in the water of the desired solids content.

2. An aqueous epoxy resin emulsion which comprises by weight no more than 55% of the preliminary reaction product of a liquid epoxy resin selected from the group consisting of epoxidized novolak resins, epoxidized polyelofin resins, and the reaction product of bis-phenol and epichlorohydrin and a boric acid ester of boric acid and both an alkylene glycol and a beta-dialkyl substituted aminoalkanol having the general formula:

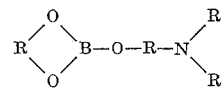

where R is an alkyl group having from 2–6 carbon atoms in the chain, and the R may be the same or different alkyl groups, said preliminary reaction product being formed by reacting together 100 parts of the liquid epoxy resin and from 3 to 10 parts of the boric acid ester at a temperature of about 50–55° C. for about 5 to 15 minutes prior to mixing with the water, said emulsion being capable of forming a subsequent cross-linking reaction product yielding a water insoluble thermoset resinous product.

3. The composition of claim 2 wherein the epoxy resin is a epoxy novolak resin having the formula:

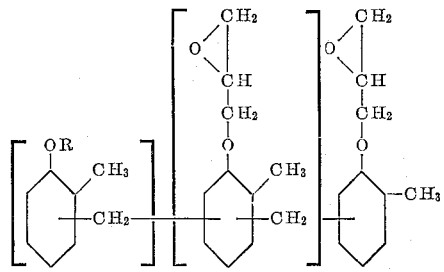

References Cited by the Examiner
UNITED STATES PATENTS

| | | | |
|---|---|---|---|
| 2,872,428 | 2/1959 | Schroeder | 260—29.2 |
| 2,970,130 | 1/1961 | Firestone | 260—47 |
| 3,257,347 | 6/1966 | Woods et al. | 260—29.2 |

OTHER REFERENCES

Borester Boric Acid Esters, Chemical and Engineering News, vol. 36, July 21, 1958, pages 112 and 113.

New Curing Agents for Epoxy Resins, SPE Journal, March 1960, pages 315–318.

MURRAY TILLMAN, *Primary Examiner.*

J. C. BLEUTGE, *Assistant Examiner.*